(12) United States Patent
Mallary et al.

(10) Patent No.: US 8,658,292 B1
(45) Date of Patent: Feb. 25, 2014

(54) SYSTEMS AND METHODS FOR CONTROLLING DAMPING OF MAGNETIC MEDIA FOR ASSISTED MAGNETIC RECORDING

(75) Inventors: Michael L. Mallary, Sterling, MA (US); Gerardo A. Bertero, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 102 days.

(21) Appl. No.: 13/157,676

(22) Filed: Jun. 10, 2011

(51) Int. Cl.
G11B 5/66 (2006.01)

(52) U.S. Cl.
USPC ........ 428/828; 428/828.1; 428/829; 428/830; 428/836.1

(58) Field of Classification Search
None
See application file for complete search history.

(56) References Cited

U.S. PATENT DOCUMENTS

| | | | |
|---|---|---|---|
| 4,833,560 A | 5/1989 | Doyle | |
| 6,830,824 B2 * | 12/2004 | Kikitsu et al. | 428/828.1 |
| 7,354,664 B1 | 4/2008 | Jiang et al. | |
| 8,228,636 B2 * | 7/2012 | Lomakin et al. | 360/135 |
| 2004/0137277 A1 * | 7/2004 | Iwasaki et al. | 428/694 TM |
| 2005/0129985 A1 * | 6/2005 | Oh et al. | 428/694 TS |
| 2005/0274221 A1 * | 12/2005 | Ziani et al. | 75/228 |
| 2007/0003792 A1 * | 1/2007 | Covington et al. | 428/812 |
| 2009/0061259 A1 * | 3/2009 | Lee et al. | 428/828 |
| 2009/0155627 A1 | 6/2009 | Berger et al. | |
| 2010/0073813 A1 | 3/2010 | Dai et al. | |
| 2010/0124672 A1 | 5/2010 | Thangaraj et al. | |
| 2010/0309577 A1 | 12/2010 | Gao et al. | |
| 2012/0251845 A1 * | 10/2012 | Wang et al. | 428/827 |

OTHER PUBLICATIONS

Bailey, William, Pavel Kabos, Frederick Mancoff and Stephen Russek, Control of Magnetization Dynamics in Ni18Fe19 Thin Films Through the Use of Rare-Earth Dopants, IEEE Transactions of Magnetics, vol. 37, No. 4, Jul. 2011, pp. 1749-1754.
Krivoski, Pavol, Sangita S. Kalarickal, Nan Mo, Stella We and Carl E. Patton, "Ferromagnetic Resonance and Damping in Granular Co-Cr Films with Perpendicular Anisotropy," Applied Physics Letters 95, American Institute of Physics, May 2009, 3 pages.
Nedo, Hitachi and Hitachi GST, "Microwave-Assisted Magnetic Recording for Net Gen HDD," StorageNewsletter.com, Nov. 2010.
Zhu, Jiang-Gang, Xiaochun Zhu and Yuhui Tang, "Microwave Assisted Magnetic Recording," IEEE Transactions on Magnetics, vol. 44, No. 1, January, pp. 125-131, Jan. 2008.

* cited by examiner

Primary Examiner — Kevin Bernatz

(57) ABSTRACT

Systems and methods for controlling the damping of magnetic media for magnetic recording are described. One such system includes a magnetic media structure for magnetic recording, the media structure including at least one base layer including an interlayer, a bottom magnetic recording layer positioned on the interlayer, and an exchange coupling layer positioned on the bottom layer; and a capping magnetic recording layer positioned on the at least one base layer, the capping recording layer including a first material configured to increase a damping constant of the capping recording layer to a first preselected level.

4 Claims, 3 Drawing Sheets

100 # SYSTEMS AND METHODS FOR CONTROLLING DAMPING OF MAGNETIC MEDIA FOR ASSISTED MAGNETIC RECORDING

FIELD

The present invention relates to media used in storage systems, and more specifically to systems and methods for controlling the damping of magnetic media for assisted magnetic recording.

BACKGROUND

Perpendicular magnetic recording (PMR) is approaching the maximum areal density (AD) that can be achieved with multi-layer media in which the magnetic anisotropy field (Hk) is graded from a low value in the top layer to a high value in the lowest layer. Therefore alternate recording technologies such at heat assisted magnetic recording (HAMR) and microwave assisted magnetic recording (MAMR) are being investigated to achieve higher areal density. Though HAMR has the largest areal density potential, it is quite difficult to achieve due to the large number of required head and media changes. In addition, the high temperatures typically involved in HAMR recording present reliability concerns. Even though MAMR generally cannot achieve as high an areal density as HAMR, it requires relatively small changes in the heads and media. As such, MAMR is of interest as a back fill technology until the day when HAMR is required.

Various publications on MAMR theory indicate that MAMR generally benefits from low media damping. However, MAMR write simulations with a spin torque oscillator (STO) microwave field source show that while low media damping reduces the required microwave field strength, it also leads to undesirable consequences such as large increases in the magnetic write width and transition jitter. As such, an improved magnetic media for use in PMR and MAMR applications that addresses these problems is desirable.

SUMMARY

Aspects of the invention relate to systems and methods for controlling the damping of magnetic media for magnetic recording. In one embodiment, the invention relates to a magnetic media structure for magnetic recording, the media structure including at least one base layer including an interlayer, a bottom magnetic recording layer positioned on the interlayer, and an exchange coupling layer positioned on the bottom layer, and a capping magnetic recording layer positioned on the at least one base layer, the capping recording layer including a first material configured to increase a damping constant of the capping recording layer to a first preselected level.

In another embodiment, the invention relates to method for increasing a damping constant of a magnetic media structure for magnetic recording, the method including providing at least one base layer including an interlayer, a bottom magnetic recording layer positioned on the interlayer, and an exchange coupling layer positioned on the bottom layer, providing a capping magnetic recording layer positioned on the at least one base layer, and adding a first material to the capping recording layer, the first material configured to increase the damping constant of the capping recording layer to a first preselected level.

In yet another embodiment, the invention relates to a method for increasing a damping constant of a magnetic media structure for microwave assisted magnetic recording, the method including providing at least one base layer including an interlayer, a bottom magnetic recording layer positioned on the interlayer, and an exchange coupling layer positioned on the bottom layer, providing a capping magnetic recording layer positioned on the at least one base layer, and adding a first material to the capping recording layer, the first material configured to increase the damping constant of the capping recording layer to a first preselected level, wherein the media structure is configured for use in microwave assisted magnetic recording.

DETAILED DESCRIPTION

Figure 1:
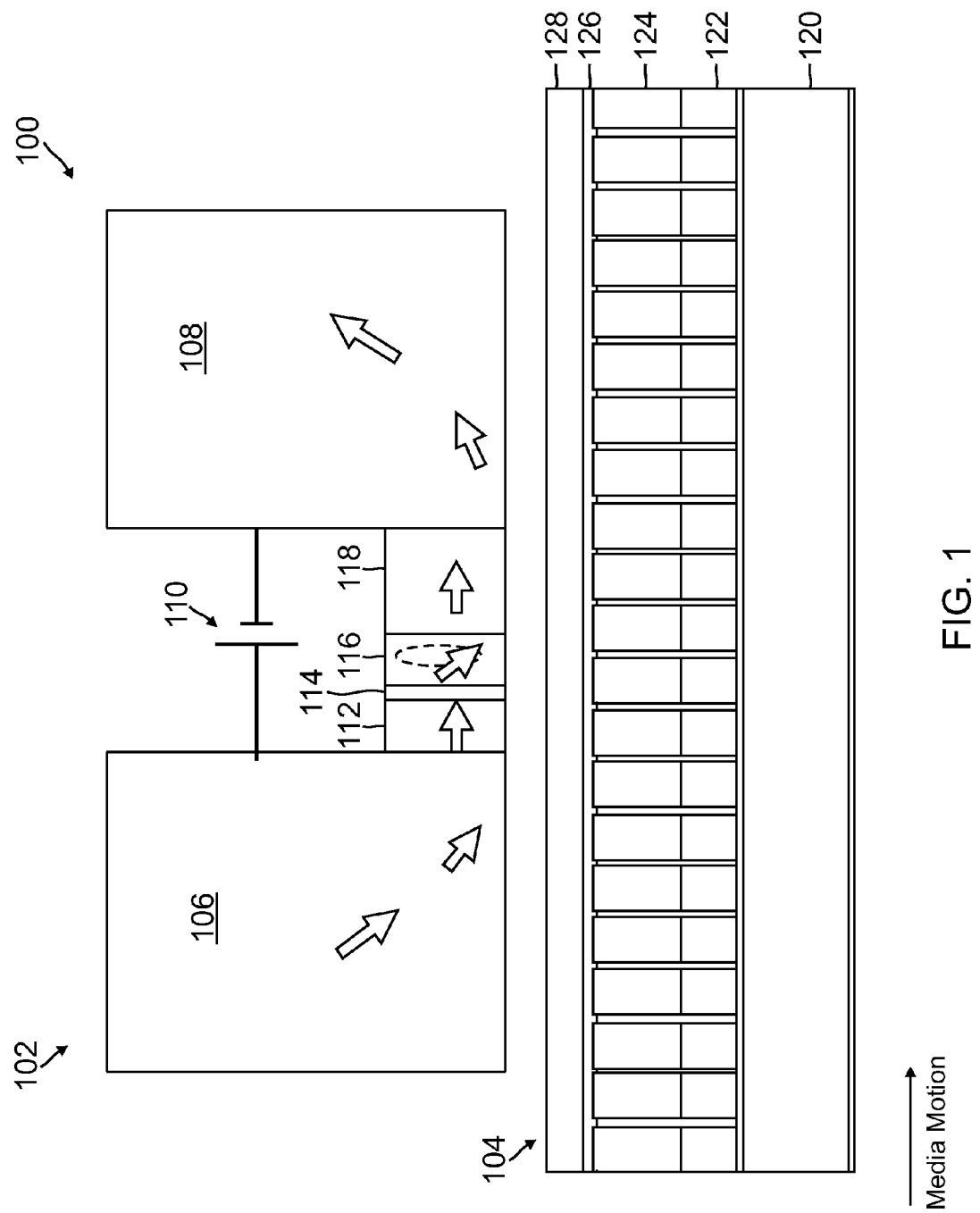
FIG. 1 is a side view of a microwave assisted magnetic recording (MAMR) system including a read/write head positioned above a damped two layer magnetic media in accordance with one embodiment of the invention.

Referring now to the drawings, damped magnetic media structures and processes for manufacturing those structures are illustrated. The damped media structures include a capping magnetic recording layer, positioned at or near the top of the media structure that includes a doping material configured to increase the damping constant of the capping recording layer. The doping material also reduces the anisotropy field of the capping recording layer. To compensate for the reduced anisotropy field, a second material is added to the capping recording layer to boost the anisotropy field. In several embodiments, the doping material is a rare earth material. In one embodiment, the doping material is Holmium (Ho). In several embodiments, the second material is a pre-existing alloy of the capping recording layer.

In several embodiments, the damped magnetic media structures are formed by adding the doping material to the capping recording layer of a magnetic media and then adding, or adjusting a quantity of, the second material to restore the anisotropy field to a preselected level in the capping recording layer. In some embodiments, middle recording layers (e.g., layers between the capping magnetic recording layer and a soft underlayer) are also doped and the anisotropy field thereof restored by adding the second material to the middle recording layer. In some embodiments, a read/write head configured for use in conjunction with the damped magnetic media structures is modified to compensate for the highly damped media. In one such embodiment, for example, the thickness of the field generating layer (FGL, see e.g. 116 in FIG. 1) is increased to compensate for the highly damped media.

FIG. 1 is a side view of a microwave assisted magnetic recording (MAMR) system 100 including a read/write head 102 positioned above a damped two layer magnetic media 104 in accordance with one embodiment of the invention. The head 102 includes a write pole 106 and a trailing write shield 108 electrically coupled by a voltage source 110 and physically coupled by a block (e.g., spin torque oscillator) including a polarization layer 112, a spacer 114, a field generating layer (FGL) 116, and a bias layer 118. The arrows illustrated across the head 102 are indicative of the direction of the magnetization.

The magnetic media 104 has a layered structure including, from bottom to top, a soft underlayer (SUL) 120, an interlayer 122, a bottom magnetic recording layer 124, an exchange coupling layer 126 and a doped capping magnetic recording layer 128. In many embodiments, the bottom recording layer 124 includes materials providing for a high anisotropy field. In many embodiments, a doping material has been added to the capping recording layer 128. In some embodiments, the doping material is a rare earth material, such as one or more of the elements including, without limitation, Pr, Nd, Pm, Sm, Eu, Gd, Tb, Dy, Ho, Er, Tm, Yb, Lu, and Hf. In several embodiments, the doping material is Ho. In several embodiments, a concentration of the doping material is set to a preselected level. In one embodiment, the doping material is Ho and the preselected level is set to about, or less than, 4 percent. In another embodiment, the doping material is Ho and the preselected level is set to about, or less than, 2 percent. In some embodiments, the doping material is a suitable material having a high magnetic moment. In some embodiments, layered structure of the magnetic media 104 does not include a soft underlayer.

The addition of the doping material to the capping recording layer 128 generally reduces the anisotropy field of the capping recording layer 128. To compensate for the reduction in the anisotropy field, a second material is added to the capping recording layer 128. In several embodiments, the capping recording layer 128 initially includes the second material and an additional quantity of the second material is added thereto. In one embodiment, the second material is platinum. In such case, the additional platinum (Pt) increases the anisotropy field of the capping recording layer 128. In several embodiments, a preselected quantity of the second material is added to the capping recording layer 128 to restore the anisotropy field to a preselected level. In one embodiment, the preselected level is about the level of the anisotropy field before any doping material has been added to the capping recording layer 128.

In one embodiment, a preselected quantity of the doping material is added to the capping recording layer 128 to obtain a preselected level for the damping constant of about 3 percent or greater. In some embodiments, the preselected level for the damping constant is in a range extending from about 10 percent to about 20 percent.

In some embodiments, the soft underlayer 120 is formed of CoFeNi, the interlayer 122 is formed of Ru, the bottom recording layer 124 is formed of CoCrPt, the exchange coupling layer 126 is formed of Ru, and the capping recording layer 128 is formed of CoCrPtHo (e.g., where Ho is acting as the doping material). In other embodiments, the layers of the magnetic media structure can be formed of other suitable materials. In one embodiment, for example, the capping recording layer 128 is formed of CoCrPtTb (e.g., where Tb is acting as the doping material). In one embodiment, the interlayer 122 is formed of a Ru alloy, another alloy, or another suitable structure. In some embodiments, the exchange coupling layer 126 can be a metal that is non-magnetic or weakly magnetic, or a non-magnetic oxide.

In some embodiments, the thickness of the field generating layer 116 of the spin torque oscillator is increased to compensate for the increased damping constant of the capping recording layer 128. In some embodiments, the magnetic media 104 can be used in conjunction with a perpendicular magnetic recording system rather than a microwave assisted magnetic recording system in order to achieve higher data rate performance.

In several embodiments, the magnetic media 104 has an initial graded anisotropy field such that the capping recording layer 128 has relatively low anisotropy, and the bottom recording layer 124 has an anisotropy field greater than that of the capping recording layer 128. In a number of embodiments, a quantity of the second material is added to the capping recording layer 128 to both increase the anisotropy field and thereby preserve a graded anisotropy field that is about the same as the initial graded anisotropy field.

Figure 2:
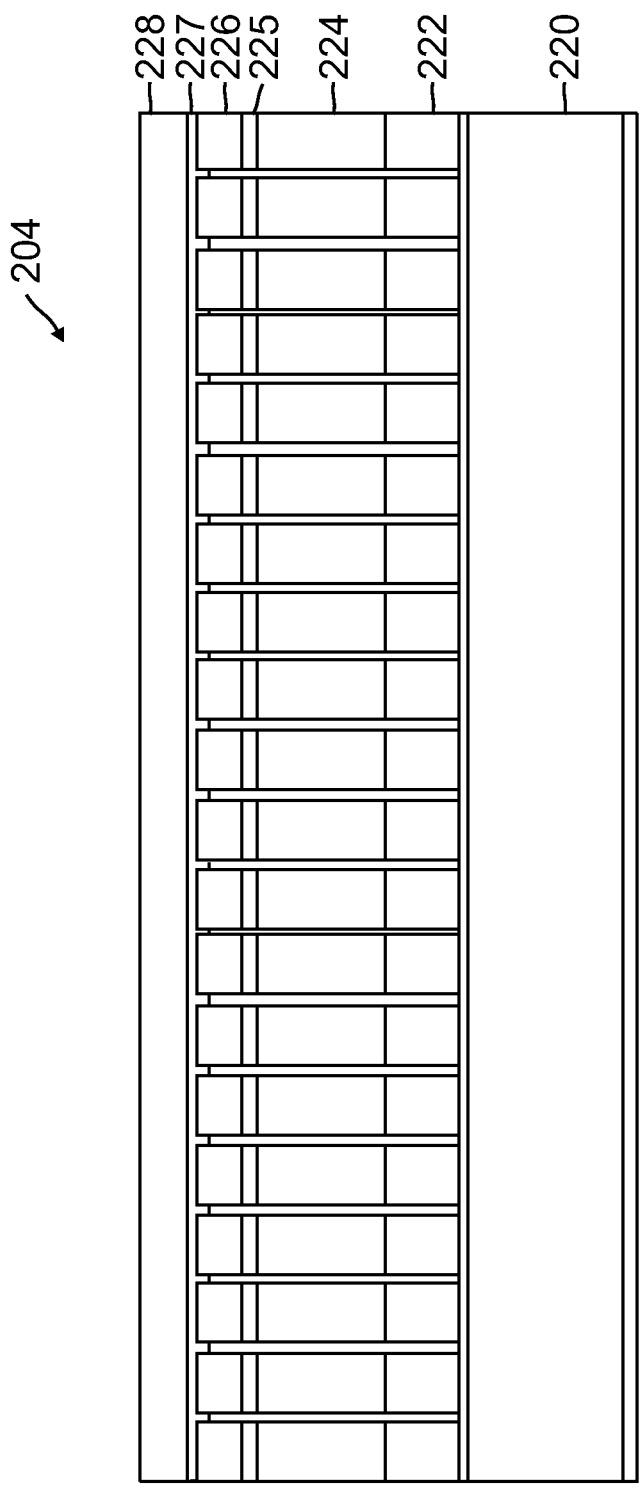
FIG. 2 is a side view of a damped three layer magnetic media that can be used in conjunction with the read/write head of FIG. 1 in accordance with one embodiment of the invention.

FIG. 2 is a side view of a damped three layer magnetic media 204 that can be used in conjunction with the read/write head of FIG. 1 in accordance with one embodiment of the invention. The magnetic media 204 has a layered structure including, from bottom to top, a soft underlayer 220, an interlayer 222, a bottom magnetic recording layer 224, a first exchange coupling layer 225, a middle magnetic recording layer 226, a second exchange coupling layer 227, and a doped capping magnetic recording layer 228. In many embodiments, the bottom recording layer 224 includes materials providing for an anisotropy field having a relatively high level (e.g., higher than that of the middle recording layer 226 and capping recording layer 228). In many embodiments, the middle recording layer 226 includes materials providing for an anisotropy field having a medium level (e.g., lower than the anisotropy field of the bottom recording layer 224 and higher than that of the capping recording layer 228).

In many embodiments, a doping material has been added to the capping recording layer 228. In some embodiments, the doping material is a rare earth material, such as one or more of the elements including, without limitation, Pr, Nd, Pm, Sm, Eu, Gd, Tb, Dy, Ho, Er, Tm, Yb, Lu, and Hf. In several embodiments, the doping material is Ho. In several embodiments, a concentration of the doping material is set to a preselected level. In one embodiment, the doping material is Ho and the preselected level is set to about, or less than, 4 percent. In another embodiment, the doping material is Ho and the preselected level is set to about, or less than, 2 percent. In some embodiments, the doping material is a suitable material having a high magnetic moment.

To compensate for the reduction in the anisotropy field, a second material is added to the capping recording layer 228. In several embodiments, capping the recording layer 228 initially includes the second material and an additional quantity of the second material is added thereto. In one embodiment, the second material is platinum. In such case, the additional platinum (Pt) increases the anisotropy field of the capping recording layer 228. In several embodiments, a preselected quantity of the second material is added to the capping recording layer 228 to restore the anisotropy field to a preselected level. In one embodiment, the preselected level is about the level of the anisotropy field before any doping material has been added to the capping recording layer 228.

In some embodiments, the middle recording layer 226 is also doped with a doping material to increase the damping constant of the middle recording layer 226. In such case, and similar to the doping of the capping recording layer 228, a concentration of another material in the middle recording layer 226 can be increased to boost the anisotropy field of the middle recording layer 226 and thereby counteract the reduction caused by the addition of the doping material.

In one embodiment, a preselected quantity of the doping material is added to the capping recording layer 228 to obtain a preselected level for the damping constant of about 3 percent or greater. In some embodiments, the preselected level for the damping constant is in a range extending from about 10 percent to about 20 percent.

In several embodiments, the magnetic media 204 has an initial graded anisotropy field such that the capping recording layer 228 has relatively low anisotropy, the middle recording layer 226 has an anisotropy field greater than that of the capping recording layer 228, and the bottom recording layer 224 has an anisotropy field greater than that of the middle recording layer 226. In a number of embodiments, a quantity of the second material is added to the capping recording layer 228 and middle recording layer 226 to both increase the anisotropy fields thereof and thereby preserve a graded anisotropy field that is about the same as the initial graded anisotropy field.

In several embodiments, the materials of the magnetic media 204 can be the same as those of the magnetic media 104 of FIG. 1. In such case, the first exchange coupling layer 225 and second exchange coupling layer 227 can be formed of Ru, and the middle layer 226 can be formed of CoCrPt. If the middle recording layer 226 is also doped, it can include Ho or one of the other suitable rare earth materials referenced above.

Figure 3:
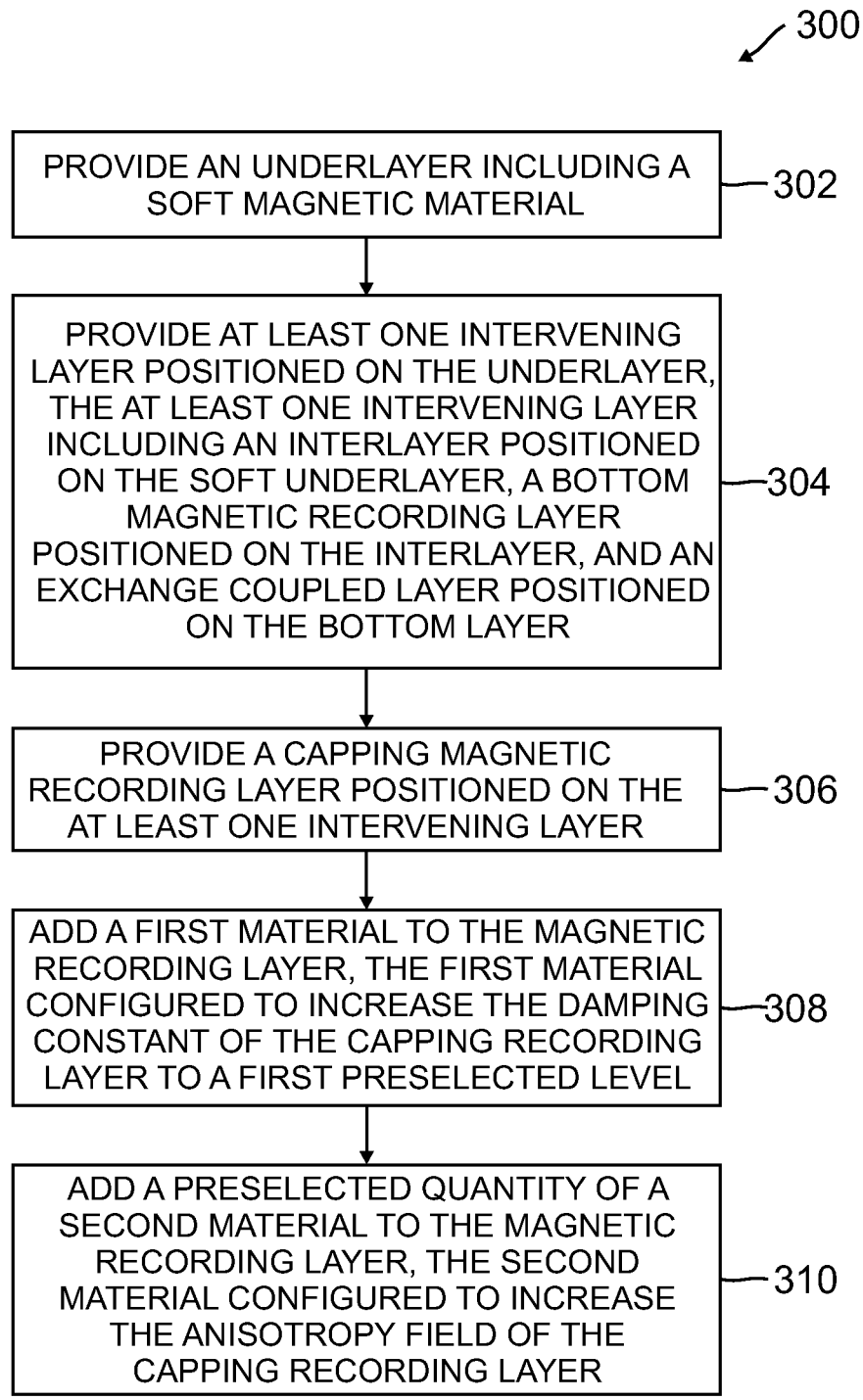
FIG. 3 is a flowchart of a process for forming a damped magnetic media in accordance with one embodiment of the invention.

FIG. 3 is a flowchart of a process 300 for forming a damped magnetic media in accordance with one embodiment of the invention. In particular embodiments, the process 300 can be used to form either the two layer magnetic media of FIG. 1 or the three layer magnetic media of FIG. 2. The process first provides (302) an underlayer including a magnetic material. In several embodiments, the underlayer includes CoFeNi. The process then provides (304) at least one intervening layer positioned on the underlayer. In several embodiments, the at least one intervening layer includes an interlayer, a bottom recording layer and an exchange coupling layer. In some embodiments, the at least one intervening layer includes an interlayer, a bottom recording layer, a first exchange coupling layer, a middle recording layer, and a second exchange coupling layer.

The process then provides (306) a capping magnetic recording layer positioned on the at least one intervening layer. The process adds (308) a first material to the capping recording layer, the first material configured to increase the damping constant of the capping recording layer to a first preselected level and to reduce an anisotropy field of the capping recording layer. In several embodiments, the first material is a doping material including one or more of the rare earth materials referenced above. In some embodiments, the process then adds (310) a preselected quantity of a second material to the capping recording layer, the second material configured to increase the anisotropy field of the capping recording layer. In several embodiments, the actions of blocks 308 and 310 are performed at about the same time. In one such embodiment, the actions of blocks 308 and 310 are performed using simultaneous sputtering or co-sputtering. In several embodiments, the second material is platinum or another suitable material. In several embodiments, the preselected quantity is selected to return the anisotropy field to an optimum level. The optimum field level can be determined both theoretically and/or empirically, and is often a trade off between efforts to minimize the required field strength of the magnetic read/write head and efforts to maximize a thermal stability of the grains of the magnetic media.

In some embodiments, a thickness of the field generating layer in a spin torque oscillator of the read/write head is increased to compensate for the increased damping in the magnetic media. In several embodiments, the top and middle recording layers of the media are doped while the bottom recording layer is not doped.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In some embodiments, for example, the doped magnetic media can be a media structure having more than two or three layers. In one embodiment, the doped magnetic media can be a four layer media structure. In several embodiments, the media structures can have multiple recording layers having graded anisotropy, having one or more exchange coupling layers separating adjacent recording layers, and having a doped capping recording layer. In one such embodiment, the exchange coupling layers are eliminated from the media structure.

What is claimed is:

1. A magnetic media structure for magnetic recording, the media structure comprising:
    at least one base layer comprising:
        an interlayer,
        a bottom magnetic recording layer positioned on the interlayer, and
        an exchange coupling layer positioned on the bottom layer; and
    a capping magnetic recording layer positioned on the at least one base layer, the capping recording layer comprising a first material that increases a damping constant of the capping recording layer,
    wherein the capping recording layer comprises a preselected quantity of a second material that increases the anisotropy field of the capping recording layer and thereby compensates for a reduction in the anisotropy field caused by the first material, and
    wherein the preselected quantity is set to a level configured to return the anisotropy field of the capping recording layer to about a preselected level corresponding to a level of the anisotropy field when the capping recording layer does not include the first material.

2. A magnetic media structure for magnetic recording, the media structure comprising:
    at least one base layer comprising:
        an interlayer,
        a bottom magnetic recording layer positioned on the interlayer, and
        an exchange coupling layer positioned on the bottom layer; and
    a capping magnetic recording layer positioned on the at least one base layer, the capping recording layer comprising a first material that increases a damping constant of the capping recording layer, and
    wherein the at least one base layer comprises:
        a middle magnetic recording layer comprising a third material configured to increase a damping constant of the middle layer to a third preselected level.

3. A magnetic media structure for magnetic recording, the media structure comprising:
    at least one base layer comprising:
        an interlayer, a bottom magnetic recording layer positioned on the interlayer, and
an exchange coupling layer positioned on the bottom layer; and
a capping magnetic recording layer positioned on the at least one base layer, the capping recording layer comprising a first material that increases a damping constant of the capping recording layer, and
wherein the interlayer comprises Ru,
wherein the bottom recording layer comprises CoCrPt,
wherein the exchange coupling layer comprises Ru, and
wherein the capping recording layer comprises CoCrPtTb.

4. A magnetic media structure for magnetic recording, the media structure comprising:
at least one base layer comprising:
an interlayer,
a bottom magnetic recording layer positioned on the interlayer, and
an exchange coupling layer positioned on the bottom layer; and
a capping magnetic recording layer positioned on the at least one base layer, the capping recording layer comprising a first material that increases a damping constant of the capping recording layer, and
wherein the at least one base layer further comprises:
a middle magnetic recording layer positioned on the exchange coupling layer, and
a second exchange coupling layer positioned on the middle recording layer, and
wherein the capping recording layer is positioned on the second exchange coupling layer, and
wherein the interlayer comprises Ru,
wherein the bottom recording layer comprises CoCrPt,
wherein the exchange coupling layer comprises Ru,
wherein the middle recording layer comprises CoCrPt,
wherein the second exchange coupling layer comprises Ru, and
wherein the capping recording layer comprises CoCrPtTb.

\* \* \* \* \*